Jan. 21, 1964   T. J. ARCURI   3,118,168
GLIDE ASSEMBLY FOR MATERIAL HANDLING APPARATUSES
Filed Feb. 21, 1961   3 Sheets-Sheet 1
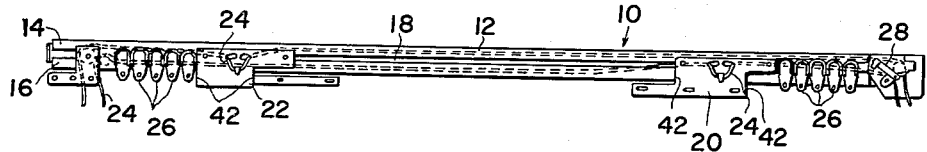
FIG. 1
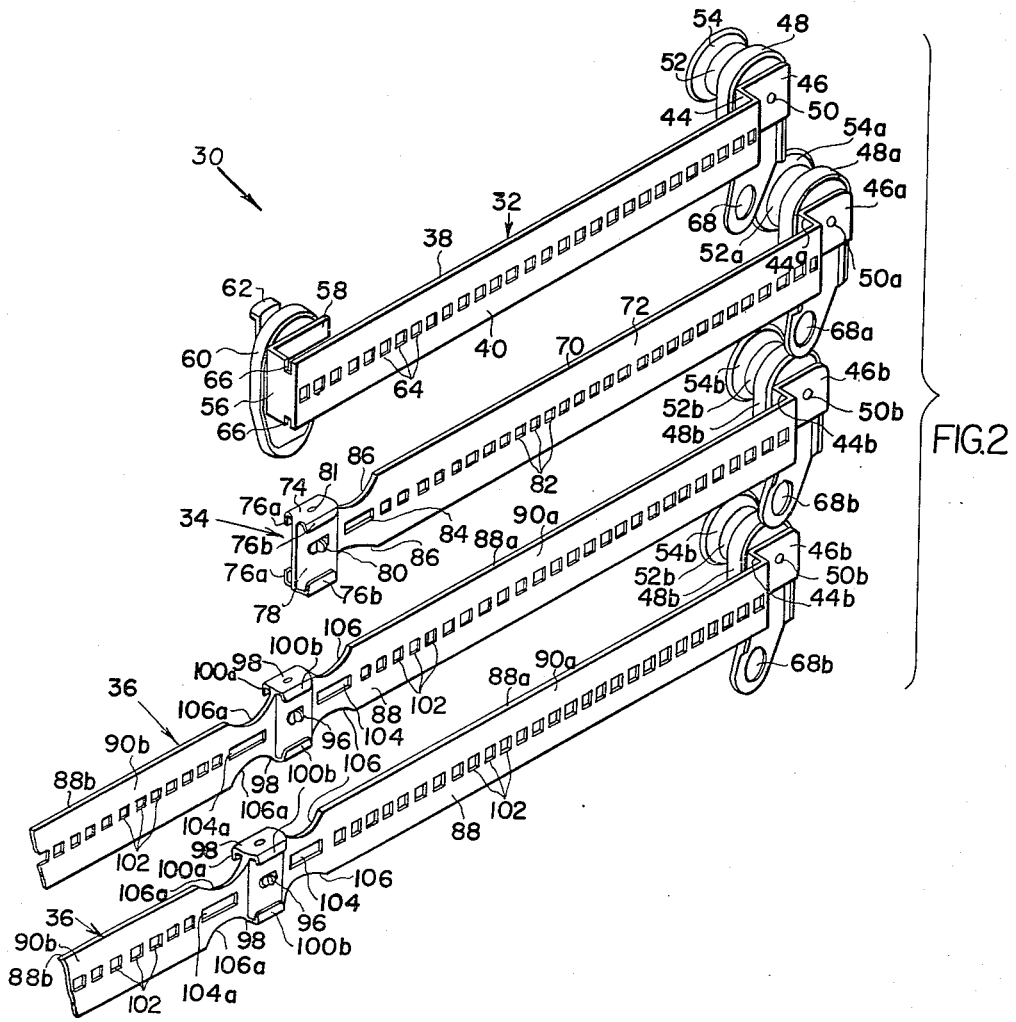
*INVENTOR.*
THOMAS J. ARCURI
BY
ATTORNEY Jan. 21, 1964 T. J. ARCURI 3,118,168
GLIDE ASSEMBLY FOR MATERIAL HANDLING APPARATUSES
Filed Feb. 21, 1961 3 Sheets-Sheet 2

INVENTOR.
THOMAS J. ARCURI
BY
*Jerome Bauer*
ATTORNEY.

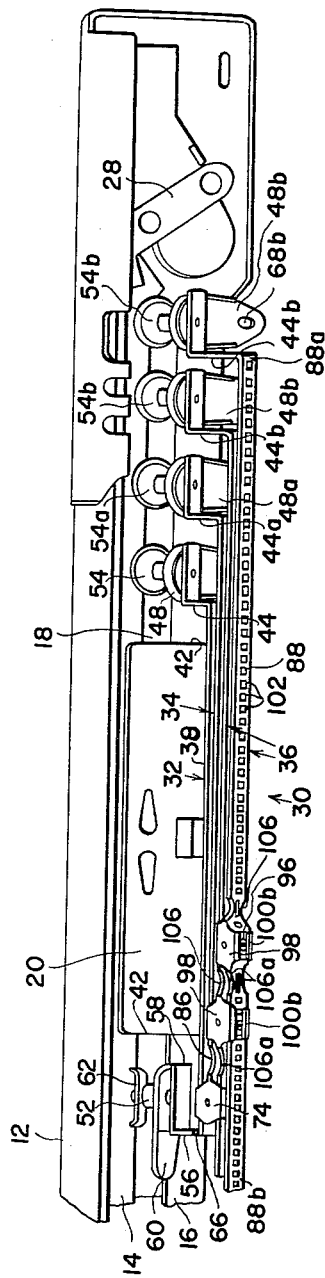
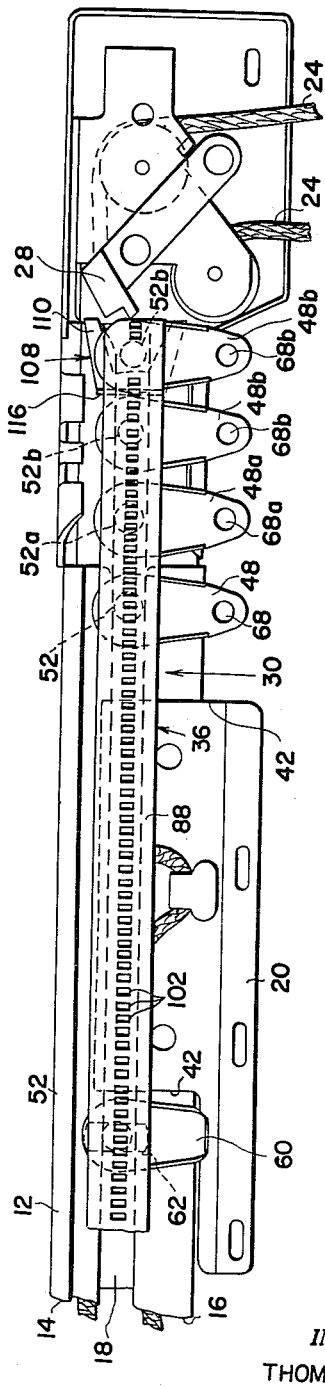

United States Patent Office 3,118,168
Patented Jan. 21, 1964

3,118,168
GLIDE ASSEMBLY FOR MATERIAL HANDLING APPARATUSES
Thomas J. Arcuri, 33 Schuyler Ave., Rockville Centre, N.Y.
Filed Feb. 21, 1961, Ser. No. 90,680
11 Claims. (Cl. 16—87)

This invention relates to a glide assembly similar to that disclosed in co-pending application Serial No. 65,393, filed October 27, 1960, and may be particularly adapted for use with material handling apparatuses although it is not specifically limited for such use.

It is the desideratum of this invention to facilitate the equal or proportionate separation of structures for whatever use the same may be put. One readily obvious application of the invention is to enable the conversion of conventional or existing material handling apparatuses so they may support and move material in a predetermined proportionate spaced relation. The purposes of the present invention may be exemplified by applying the same to a drapery traverse rod so that the folds of the drapery material supported therefrom are constantly maintained and moved proportionately relative to each other.

An object and feature of the invention is to provide a glide assembly comprising a plurality of glide units adapted to support material thereon and to move the same proportionately relative to each other.

Another object of the invention is to provide a glide assembly that can be employed for use with a conventional material handling apparatus to enable such apparatus to move the material handled thereby equally or predetermined proportionate distances. A feature of the invention resides in its unique details of construction that enables the same to be applied quickly and easily to a conventional material handling apparatus to accomplish the aforedescribed objects.

Figure 3:
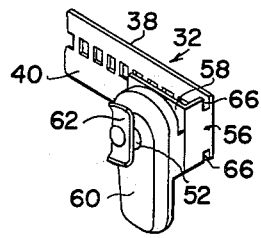
Figure 5:
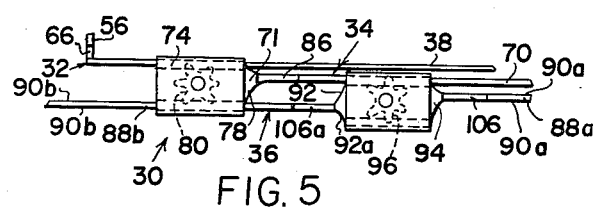
Figure 4:
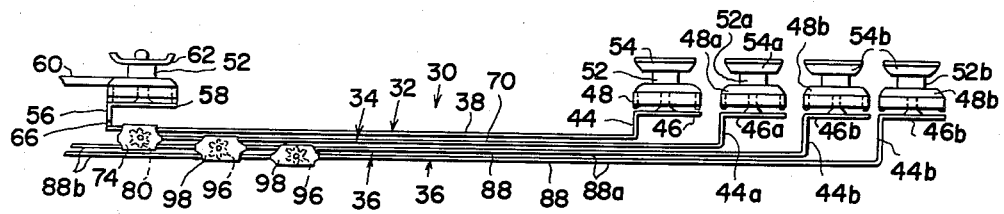
Figure 6:
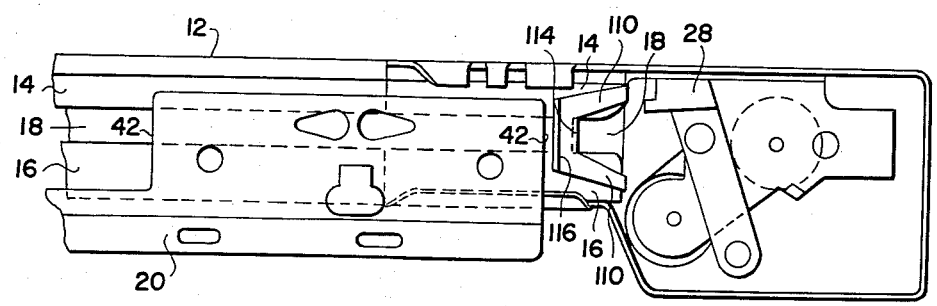
Figure 7:
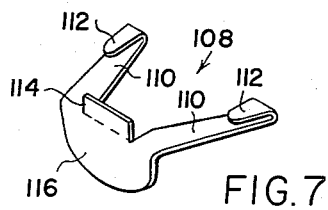

Other and further objects of my invention reside in the structures and arrangements hereinafter more fully described with reference to the accompanying drawings in which:

FIG. 1 is a rear view of a conventional drapery traverse rod,

FIG. 2 is an exploded perspective view of units of the glide assembly constructed according to the teaching of the invention, FIG. 3 is a perspective view of the front of the guide lock, FIG. 4 is a top view of the glide assembly of FIG. 2, FIG. 5 is an enlarged top view of a portion of the glide assembly shown in FIG. 4, FIG. 6 is a rear view of one end of the traverse rod of FIG. 1 including a lock clip constructed according to the invention, FIG. 7 is a perspective view of the reverse side of the lock clip of FIG. 6, FIG. 8 is a top perspective view of the traverse rod of FIG. 1 and the glide assembly of FIG. 4 in position for assembly, and FIG. 9 is a front view of FIG. 8 with the parts thereof assembled and engaged according to the invention.

Referring to the drawing and more particularly to FIG. 1 thereof, there is shown a material handling apparatus generally identified by the numeral 10. The material handling apparatus 10 may be of any conventional or well-known construction. However, for ease of explanation and understanding of the inventive details, the material handling apparatus here shown in FIG. 1 is in the form of a drapery or curtain traverse rod. FIG. 1 illustrates the rear portion of the traverse rod or that portion that faces the wall and is obstructed from view by those persons in the room or area which the drapery or curtain faces.

The material handling apparatus 10 of FIG. 1, being of any conventional or well-known construction, comprises an elongated material handling housing 12. Like most traverse rods, the housing 12 may be increased or decreased in length by being composed of a pair of housing members that move telescopically within and relative to each other. Because these details are conventional in nature, they are not illustrated in the drawing. The material handling houisng 12 has a pair of inturned walls 14 and 16, the edges of which are spaced from each other to define a guideway 18 that extends for the full effective length of the apparatus 10.

The conventional or well-known traverse rod 10 comprises a pair of relatively movable master guide members 20 and 22 that are joined with a string 24. The string extends along the length of the traverse rod 10 and about pulleys (not fully illustrated) to enable the same to be moved almost frictionlessly to move the glide members 20 and 22 relative to each other to close or open the drapery supported thereon. In the actual use of the conventional traverse rod 10, there is provided a plurality of idler glide elements 26 that slide freely within the guideway 18 but are unconnected mechanically for movement with each other or with the master glide members 20 or 22 on their respective sides of the traverse rod housing 12. Both the idler glide elements 26 and the master glide members 20 and 22 are initially inserted for sliding movement within the guideway 18 at the righthand end thereof.

A pivotal lever 28 is mounted at the righthand end of the housing 12, and being pivotable, is adapted to be moved into a position as shown in FIG. 9 to cover its respective end of the guideway to thereby prevent the accidental displacement or removal of the idler glide elements 26 or the master glide members 20 and 22 therefrom. The lever 28 is also adapted to be pivoted to an inactive or to an unobstructing position such as that shown in FIG. 6 wherein the same permits free and unobstructed access to the guideway 18 and thus permits the insertion and removal of glide elements into and from cooperative engagement with the guideway.

Under normal conditions of operation of the conventional or well-known traverse rod 10 of the prior art, the folds of the drapery or curtain or other material are supported on the master glide members 20 and 22 for movement therewith. The additional folds of such drapery or other material are then hung or supported on the idler glide elements 26 on their respective sides of the housing 12. Hence, when the master glide members 20 and 22 are actuated by the string 24 to move toward each other to close the drapery, the connected folds of the drapery separate from each other successively seriatim. As each fold separates from the next adjacent fold in response to the movement of its respective master glide member 20 and 22, it pulls with it the idler glide element 26 on which the same is hung. In consequence, the folds of the drapery or other material supported from the material handling apparatus 10 separate unevenly or disproportionately and provide an unsightly appearance. Similarly, when the master glide members 20 and 22 are actuated by the string 24 to open the drapery or other material supported thereon and on their respective idler glide elements 26, the folds of such material move toward each other unequally or in disproportionate relation with each other, again providing an unsightly appearance.

In carrying forth the objects of the present invention to permit the conversion of prior art material handling apparatuses to enable the same to handle material in equal spaced or proportionately spaced relationship, there is provided a glide assembly generally identified by the numeral 30, shown in FIGS. 2 to 9 inclusive. In use with the apparatus 10, the glide assembly 30 is adapted to be substituted for the idler glide elements 26 of such apparatus, and when so substituted, enables the support of material from the same in such manner that when the master glide members 20 and 22 thereof are actuated by the connected string 24 to move toward or away from each other, the material, for example, the folds of a drapery supported from the inventive glide assembly 30 will move in proportionate spaced relation corresponding to movement of such master glide members.

To better understand the inventive details and to more clearly recognize their application to prior art material handling apparatuses of the type 10 illustrated in FIG. 1, reference is now made to FIGS. 2 to 5. The glide assembly 30 comprises a plurality of glide units, one of which is here referred to as an adaptor or bracket glide unit generally identified by the numeral 32. Another of the glide units is here referred to, in a general manner, as an intermediate glide unit and generally identified by the numeral 34, while still a further one is known as a basic glide unit and generally referred to by the numeral 36. In FIG. 2, there is shown not one but two basic glide units 36 to portray the fact that any number of additional basic glide units 36 may be contained in the assembly 30 to accommodate the support of any desired number of pieces of material therefrom.

The adaptor glide units 32 comprises a body member 38 that has a planar surface 40. Surface 40 is elongated and slightly longer in length than that of the body portion of each of the master glide members 20 and 22 as defined between their respectively spaced walls 42. One end of the surfaces 40 is bent in a substantially Z-shaped formation and includes a wall 44 that terminates in a bracket arm 46. Mounted on the bracket arm 46 is a guide element 48 that pivots at 50 thereon. The guide element 48 has a circular bearing surface 52 of sufficient diameter to ride in the guideway 18 and terminates in an enlarged limiting obstruction 54 that extends behind the guideway defining walls 14 and 16 to prevent the guide element 48 from being moved laterally outward from engagement with the guideway. Hence, when the guide element 48 has its narrowed circular surface 52 engaged in the guideway 18, it will remain therein because of the enlarged limiting obstruction 54 preventing the same from being displaced laterally therefrom.

The opposite end of the surface 40 terminates in a U-shaped bracket formation having a base wall 56 and a bracket arm 58 on which a guide lock 60 is swivelly or pivotally mounted. The front of the guide lock 60 is illustrated in FIG. 3 wherein it will be seen that the same is constructed similar to the guide element 48 previously described in that it, too, includes a narrowed circular bearing surface 52 that is adapted to ride between the defining walls 14 and 16 of the guideway 18. However, unlike the guide element 48, it is provided with a limiting narrowed obstruction 62 that serves the function of a lock to permit the guide lock 60 to be engaged in and disengaged from the guideway 18 simply by pivoting the same on the bracket arm 58.

The limiting obstruction 62 has a pair of substantially parallel sides each spaced from the other slightly less than the height of the guideway 18 or the space between the guideway defining walls 14 and 16 of the housing 12. Therefore, when the guide lock 60 is pivoted 90° from its position as shown in FIG. 3 into that as shown in FIG. 4, the walls on the locking or limiting obstruction 62 can be aligned with the defining walls of the guideway 18 so that the same may be inserted therebetween and into the guideway. When once positioned in the guideway with its narrowed circular bearing surface 52 resting between the upper and lower edges of the walls 14 and 16, the guide lock 60 can then be pivoted downward 90° to the position as shown in FIGS. 2 and 3. The elongated ends of the obstruction 62 are brought into limiting obstructing engagement behind the guideway defining walls 14 and 16 and thus prevent accidental or unwanted lateral displacement of the guide lock 60 from guiding movement with the defining walls of the guideway 18.

The length of the planar surface 40, being longer than the distance between the defining walls 42 of the body of the master glide members 20 and 22, enables the adaptor or bracket glide unit 32 to be placed in overlying bracketing relationship therewith in a manner that will be described. The planar surface 40 is provided with a plurality of equally spaced engaging means of any convenient form. For ease of explanation, the engaging means 64 may be described as openings provided in the face of the surface 40 and extend, like a rack, for the full length thereof. The base wall 56 has notches or cutouts 66 at its upper and lower edges. The guide element 48, swingingly mounted at 50 on the bracket arm 46, has an end that depends below the body member 38 and includes an opening 68 through which a hook may be inserted for the convenient support of material, such as the fold of a drapery or curtain.

The intermediate glide unit 34 includes a body member 70 that has oppositely disposed planar surfaces 72 slightly longer in length than the planar surface 40 above described. One end of the planar surfaces 72 terminates in a Z-shaped formation and has a bracket arm 46a on which is mounted a guide element 48a, the details of which are exactly the same as the guide element 48 previously described with respect to the glide unit 32. For this reason, therefore, a repetition of such details is deemed to be unnecessary and like details of construction are similarly identified with the addition of the suffix letter "a" to the identifying numerals.

The other end of the planar surfaces 72 terminates between an upper and lower set of laterally disposed arms 74. The opposite lateral ends of the arms 74 extend inward and parallel to the planar faces of the body member 70 and form oppositely disposed sets of guide legs 76a and 76b. A spacer plate 78 is mounted against one surface of the planar surface 72 and securely sandwiches between itself and the body member 70, a mover means in the form of a rotatable pinion 80 having a pinion shaft 81 whose axis of rotation is parallel to one of the planar surfaces 72 but offset from alignment with the plane thereof.

The length or distance along the body member 70 between the upper and lower set of guide legs 76a and the opposite offset wall 44a is slightly greater than the length of the surface 40 of the glide unit 32 thereby permitting the body member 70 to be placed in adjacent side-by-side relationship with the surface 40 of the body member 38 with its wall 44a fitting in similar offset relationship with the wall 44. When so positioned, the upper and lower set of guide legs 76a are aligned with the notches 66 in the base wall 56. Thereafter, relative lengthwise or longitudinal movement of either of the two glide units 32 and 34 will cause the upper and lower legs 76a to move as a set into the notches 66 and in guiding engaging relation behind the body member 38. With the legs 76a so engaged behind the body 38, they prevent lateral separation of the body members 38 and 70, joining them together to enable the rotatable mover or pinion means 80 to move progressively and successively along in engagement with the engaging means 64 provided along the length of the surface 40.

Provided along the length of one of the surfaces 72 is an engaging means 82 that may take any convenient form, such as a continuous rack or row of apertures defined on or in the surface thereof in a manner like that of the engaging means 64 previously described. Defined between the engaging means 82 and the termination of the spacer plate 78 is a pinion reception slot 84. Provided along the upper and lower edges of the body member 70 immediately after the upper and lower laterally disposed arms 74 is guide leg reception cutout or slot 86.

The basic glide unit generally identified by the numeral 36 is not too dissimilar from the intermediate glide unit 34 previously described in that it, too, comprises a body member 88 divided into two body portions 88a and 88b each having planar surfaces 90a and 90b on their opposite sides. The planar surfaces 90a terminate at their one ends in a Z-shaped formation having a well 44b and a bracket arm 46b on which there is pivotly mounted at 50b a guide element 48b. The details of the guide element 48b are the same as those of the guide element 48 previously described with respect to the adaptor or bracket glide unit 32. For this reason, therefore, like details of structure contain like identifying numerals except, however, each numeral contains the suffix letter "b." The body member 88a terminates at its opposite end in an enlarged portion 92 (FIG. 5) and is joined by a spacer plate 94 to the continuation 88b of the body 88 at a similarly enlarged portion 92a.

Spacer 94 connects the two-part body member 88 composed of portions 88a and 88b and serves to support and mount between the same a mover means in the form of a rotatable pinion 96. The axis of rotation of the mover means 96 is substantially parallel to the adjacent planar surfaces 90a and 90b of the two-part body member 88, but laterally offset from lengthwise or longitudinal alignment with the same. Vertically above and below the mover means 96 are upper and lower laterally disposed arms 98 each of which has inwardly turned guide legs 100a and 100b that are spaced from the adjacent surfaces of the enlarged portions 92 of their respective body members, but substantially parallel therewith to accommodate therebetween the body member of a next adjacent glide unit.

Each of the planar surface portions 88a and 88b of the body member 88 is provided with an engaging means 102 of any convenient form as a rack, or as shown in the drawings, openings that extend completely therethrough and permit the same to be engaged on either side of the planar surfaces of the body member 88 by a mover or rotatable pinion means that may be provided on a next adjacent glide unit of the glide assembly 30 in a manner to be described. The portion 88a of the body member 88 is provided with a pinion reception slot 104 while the upper and lower edges in vertical alignment with such reception slot include reception cutouts or slots 106 to receive the guide legs of a next adjacent glide unit to enable such guide legs to be inserted therethrough for engagement with an opposite planar surface of such body member portion.

The glide units 32 and 34, and as many of the additional glide units 36 as may be required to support material, may be assembled in the manner similar to that described with respect to the assembly of the intermediate glide unit 34 with that of the adaptor or bracket glide unit 32. When once the glide unit 34 is guidingly engaged and connected in adjacent relationship with the glide unit 32 at its upper and lower set of guide legs 76a engaged behind the body member 38 after the same have moved through the slots or notches 66 and its mover means 80 is retained thereby in cooperative engagement with the engaging means 64, such glide units 32 and 34 will remain engaged until they are moved relative to each other to again slide the guide legs 76a from behind the body member 38 and hence leftward beyond the notches 66. Once units 32 and 34 are engaged as described, the enlarged portion 71 (FIG. 5) of the body member 70 will slightly space the planar surfaces 40 and 72 from each other and eliminate frictional engagement therebetween during the relative movement of their respective glide units.

The basic glide unit 36 may then be assembled to the previously assembled glide units 32 and 34 by placing the offset wall 44b adjacent to the offset wall 44a of the glide unit 34. This will position the portion 88a of the body member 88 adjacent to the body member 70 and laterally align the upper and lower guide legs 100a with the reception slots 86 of the body member 70. At the same time, the mover means 96 will be received in the reception slot 84. In like manner, the reverse is true in that the upper and lower guide legs 76b will be received and permitted to move through the reception slots 106 of that portion 88b of the body member 88 while the mover means 80 will be received in the reception slot 104a. Thereafter, relative movement of the glide unit 36 to that of the glide unit 34 will cause the respective pinion means 96 and 80 thereof to move from their respective reception slots 84 and 104a into engagement with the engaging means 82 and 102.

The double guiding action provided by the guide legs 76b engaging an opposite side of the planar surface of the body portion 88b, and the guide legs 100a engaging an opposite side or face of the body member 70 serves to retain the two glide units 34 and 36 in adjacent relationship with each other. The spacer 78 and enlarged portion 92 on each of the body members 70 and 88 space their respective planar surfaces slightly from frictional engagement with each other thereby permitting substantially free relative movement. Thus, it will be noted that each glide unit 34 and 36 is guided for longitudinal movement by a set of upper and lower guide legs provided on the next adjacent glide unit and that the mover means of each glide unit cooperates with the engaging means of the next adjacent glide unit for progressive engagement therewith and movement therealong.

When sufficient ones of the basic glide units 36 are included in the glide assembly 30 as is necessary to support material in predetermined proportionate spaced relationship, the whole glide assembly 30 is positioned relative to the guideway 18 of the material handling housing 12 in a manner similar to that shown in FIG. 8. The guide lock 60 on the adaptor or bracket glide unit 32 is pivoted 90° as shown in FIG. 8, and the limiting obstruction 62 is inserted into the guideway 18. Thereafter, the guide lock 60 is pivoted downward 90° so that the limiting obstruction 62 is positioned behind the guideway defining walls 14 and 16.

The offset base wall 56 is then moved rightward into abutting engagement with the adjacent defining end 42 of the body of the master glide member 20 while its bracket arm 58 moves therebehind. The lever 28 is pivoted to the position shown in FIG. 6 to permit the removal of all of the idler glide elements 26 from the guideway 18 and from the apparatus 10 and for insertion in their stead, the guide elements 48, 48a and 48b of the respective glide units 32, 34 and 36. The master glide member 20 is then moved fully to the right to enable the enlarged portion 54 of the guide element 48 of glide unit 32 to be inserted behind the defining walls 14 and 16 and the bearing surface 52 thereof in the guideway 18 while the lever 28 is retained in its open inactive position as shown in FIG. 6.

Each guide element 48, 48a and 48b of as many basic glide units 36 as may be included in the assembly 30, is inserted into the guideway 18. When so assembled, the walls 44 and 56 of the adaptor glide unit 32 bracket the opposite ends 42 of the master glide members 20 and 22. Hence, any movement of the master glide members 20 or 22 will cause the same to abut and engage with one of the walls 44 or 56 and move the adaptor glide unit 32 with it along the guideway 18 and relative to the housing 12.

However, in order to present the assembled glide units from moving as a whole with the master glide members 20 or 22, and to insure that each glide unit of the assembly 30 will move relative to the other in proportionate spaced relationship, one of the glide units of the assembly is retained from movement. When so retained, the mover means thereof, cooperating with the engaging means of the next adjacent glide unit, will cause each of the glide units to move relative to the other and accordingly space the guide elements 48, 48a and 48b in proportionate relationship to each other corresponding to the movement of the master glide member 20 or 22. Consequently, material supported at the openings 68, 68a and 68b of such guide elements will be proportionately spaced and constantly be maintained in such proportionate spaced relationship by virtue of the cooperation of the mover means and engaging means.

To retain one of the glide units of the assembly 30 from moving with the remaining ones of the glide units of the assembly, there is included a lock clip generally identified by the numeral 108 and shown more clearly in FIGS. 6, 7 and 9. Lock clip 108 is provided with a pair of divergent legs 110 each of which is bent over upon itself at 112. Positioned on the body of the lock clip 108 and centrally of the legs 110 is a projection 114 that fits between the walls 14 and 16 and in the guideway 18. A finger grip 116 permits manual manipulation of the lock clip 108.

The lock clip 108 is inserted into place immediately prior to the insertion of the last guide element 48b of the last one of the glide units 36 into the guideway 18. This is done by positioning the projection 114 into the guideway 18 and the legs 110 on the exposed surfaces of the walls 14 and 16. The clip 108 is then slid to the left and the bends 112 move behind the upper and lower walls 14 and 16 to engage therewith as shown in FIG. 6. The projection 114 positioned in the guideway 18 prevents tilting of the clip. Thus, the lock clip 108 is inserted just prior to the last guide element to be inserted in the guideway 18.

Thereafter, the last guide element 48b of the last glide unit 36 is inserted into the guideway 18 and abuts the projection 114 of the lock clip 108. Accordingly, it is prevented from longitudinal movement along the guideway. The lever 28 is thereafter pivoted from its inactive position as shown in FIG. 6 to its locked position as shown in FIG. 9 whereupon the last or terminal one of the guide elements is securely prevented from dislodging movement from between the guideway 18 or further movement along the guideway, by the combined locking effect of the lock clip 108 and lever 28.

It will be recognized that manipulation of the string 24 will cause master glide members 20 and 22 to move along the length of the guideway 18. The adaptor glide units 32, bracketing the same, are engaged thereby and move a corresponding distance therewith. The intermediate and basic glide units 34 and 36 are joined together with each other and with the adaptor guide unit 32 by their respective sets of guide legs. When so retained in interconnected engagement with each other, their rotatable mover means move relative to and successively along in engagement with the engaging means on the planar surfaces of the next adjacent glide units. The offset or disaligned arrangement of the axis of rotation of the mover means of each glide unit with respect to the planar surface of the body member of such glide unit enables the mover means to cooperate simultaneously with the engaging means provided on adjacent glide units on each of its opposite sides. Accordingly, any movement of the glide unit 32 with the master glide member 20 or 22 will result in a corresponding proportionate and equal movement of the remaining glide units 34 and 36 of the assembly 30. Hence, material supported therefrom at 68, 68a and 68b will remain constantly in predetermined proportionate spaced relation.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. In a material handling apparatus, a glide member movable along said apparatus in at least two directions, a glide assembly including a plurality of adjacently arranged relatively movable glide units each including rotatable means engaged with means of another one of said units to cause said units to move relative to each other in response to the movement of said glide member, and one of said movable glide units having means in the path of movement of said member and engageable by and movable with said glide member during its movement in each one of said directions.

2. In a material handling apparatus having an element movable along the apparatus in one of two directions at a time, a glide assembly comprising a plurality of units each including means to supportingly move material therewith along said apparatus in predetermined proportionate spaced relationship in accordance with the direction of movement of said element, one of said plurality of units having means engageable and movable by and according to the movement of said element along the apparatus, and means operatively engaged between each one of said plurality of units to move said units along the apparatus relative to each other in said predetermined proportionate spaced relation in accordance with the movement of said one unit with said element.

3. In a material handling apparatus as in claim 2, said glide assembly having another one of said plurality of units restrained from movement.

4. In a material handling apparatus having a guideway, an element movable therealong, a glide assembly comprising a plurality of relatively movable glide units each including guide means mounted in said guideway and material support means, one of said glide units being engageable by and during the movement of said movable element along said apparatus guideway, means joining said units together to guide the same during their relative movement, and means engageable between said joined units to move the same relative to each other in response to the movement of said one unit.

5. In a material handling apparatus as in claim 4, said glide assembly having another one of said units restrained from movement.

6. In a material handling apparatus having a guideway and an element movable therealong, a glide assembly comprising a plurality of adjacent units each movable proportionately relative to the other and along said guideway, one of said units bracketing and being engageable by said element during its movement along said guideway and movable thereby along said guideway, each of said units including a surface member having engaging means spaced therealong, and certain of said units including means rotatably cooperable with said engaging means of a next adjacent unit, each of said rotatably cooperating means being movable progressively along their respectively engaged engaging means in response to the movement of said one unit along said guideway.

7. In a material handling apparatus having a guideway and an element movable therealong, a glide assembly comprising a plurality of units each movable proportionately relative to the other and along said guideway, one of said units being engageable by said element and movable thereby along said guideway, each of said units including a body having a planar surface and engaging means spaced therealong, rotatable means on certain of said units cooperable with said engaging means of certain of said other units, said rotatable cooperating means each being movable progressively along their respectively engaging means in response to the movement of said one unit along said guideway, and said rotatable cooperating means each having an axis of rotation parallel to and offset from alignment with the plane of said surface member of its respective movable unit.

8. In a material handling apparatus as in claim 7, said glide assembly including means to restrain one of said units from movement.

9. In a material handling apparatus having a guideway and an element movable therealong, an adaptor glide unit including a surface member having a plurality of offset brackets each engageable with opposite ends of said element during the movement thereof along said guideway, guide means on each of said offset brackets movably guided for movement in said guideway, one of said guide means being movably mounted on its respective offset bracket and having a locking formation thereon to be rotated to one position for movement into and out of said guideway and to another position for locked guiding engagement with said guideway, a plurality of glide units, each of said glide units including members having planar surfaces relatively movable to each other and to said adaptor guide unit, engaging means on said surface members, rotatable means on each of said glide units engaging with said engaging means of a next adjacent surface member, and means to restrain one of said glide units from movement.

10. A glide assembly as in claim 9, said rotatable means each having an axis of rotation parallel to and offset from alignment with the plane of the surface of its respective movable units.

11. In a glide assembly, a glide unit, said glide unit including a body having a plurality of planar surfaces, a plurality of engaging means relatively spaced equally along at least one of the planar surfaces of said body, and a rotatable member mounted for rotation on said body and fixed from movement relative thereto, said rotatable member having its axis of rotation parallel with said planar surface and projecting beyond said plurality of planar surfaces.

References Cited in the file of this patent
UNITED STATES PATENTS

| | | |
|---|---|---|
| 1,649,234 | Johnson | Nov. 15, 1927 |
| 2,013,153 | Hunter | Sept. 3, 1935 |
| 2,201,804 | Volland | May 21, 1940 |
| 2,323,604 | Hyland | July 6, 1943 |
| 2,672,929 | Eggert | Mar. 23, 1954 |
| 2,848,734 | Ault | Aug. 26, 1958 |